(12) United States Patent
Dong et al.

(10) Patent No.: US 11,269,134 B2
(45) Date of Patent: Mar. 8, 2022

(54) BACKLIGHT MODULE AND DISPLAY DEVICE

(71) Applicant: SHENZHEN TCL NEW TECHNOLOGY CO., LTD., Guangdong (CN)

(72) Inventors: Xiaoxu Dong, Guangdong (CN); Wei Hua, Guangdong (CN)

(73) Assignee: Shenzhen TCL New Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/251,221

(22) PCT Filed: Dec. 20, 2019

(86) PCT No.: PCT/CN2019/127127
§ 371 (c)(1),
(2) Date: Dec. 11, 2020

(87) PCT Pub. No.: WO2020/135267
PCT Pub. Date: Jul. 2, 2020

(65) Prior Publication Data
US 2021/0247562 A1 Aug. 12, 2021

(30) Foreign Application Priority Data
Dec. 28, 2018 (CN) .......................... 201811631377.1

(51) Int. Cl.
*F21V 8/00* (2006.01)
*G02F 1/1333* (2006.01)

(52) U.S. Cl.
CPC ......... *G02B 6/0088* (2013.01); *G02B 6/0055* (2013.01); *G02F 1/133314* (2021.01); *G02F 1/133317* (2021.01)

(58) Field of Classification Search
CPC ................ G02B 6/0055; G02B 6/0088; G02F 1/133314; G02F 1/133317
See application file for complete search history.

(56) References Cited

U.S. PATENT DOCUMENTS 7,224,416 B2 * 5/2007 Cha ...................... G02B 6/0088
349/60
2011/0096569 A1 * 4/2011 Hamada ............... G02B 6/0085
362/613

(Continued)

FOREIGN PATENT DOCUMENTS

CN 1517758 A 8/2004
CN 201259594 Y * 6/2009

(Continued)

OTHER PUBLICATIONS

First Office Action in counterpart Chinese Application No. 201811631377.1, dated Apr. 22, 2020.

(Continued)

*Primary Examiner* — Keith G. Delahoussaye
(74) *Attorney, Agent, or Firm* — Nathan & Associates; Nathan Menachem

(57) ABSTRACT

Disclosed are a backlight module and a display device. The backlight module comprises: a back plate, comprising a bottom plate (10), side plates (12), and bent parts (13), and the bottom plate, the side plates, and the bent parts form an mounting space (14) in an enclosing manner; a reflective sheet (20) arranged on the bottom plate; a light guide plate (30) arranged on a side, facing away from the bottom plate (11), side of the reflective sheet (20); a film (40) arranged on a side, facing away from the reflective sheet (20), of the light guide plate (30).

18 Claims, 2 Drawing Sheets

(56) References Cited

U.S. PATENT DOCUMENTS

| | | | | |
|---|---|---|---|---|
| 2013/0093965 A1* | 4/2013 | Ishimoto | ............ | G02B 6/0088 348/744 |
| 2014/0320747 A1* | 10/2014 | Kamada | ............... | G02B 6/0088 348/725 |
| 2014/0340875 A1* | 11/2014 | Hayashi | ................ | G02F 1/1336 362/97.1 |
| 2016/0085109 A1* | 3/2016 | Baek | .................... | G02B 6/0088 362/607 |
| 2016/0209573 A1* | 7/2016 | Kuromizu | ............ | G02B 6/0088 |
| 2016/0223739 A1* | 8/2016 | Yoon | ....................... | G02B 6/009 |
| 2017/0343841 A1* | 11/2017 | Cho | ........................ | H01L 33/50 |
| 2018/0292603 A1* | 10/2018 | Yu | ......................... | G02B 6/0091 |
| 2019/0196082 A1* | 6/2019 | Jeong | ................ | G02F 1/133305 |
| 2021/0026058 A1* | 1/2021 | Shi | ......................... | G02B 6/005 |

FOREIGN PATENT DOCUMENTS

| | | |
|---|---|---|
| CN | 201259594 Y | 6/2009 |
| CN | 101672991 A | 3/2010 |
| CN | 201661999 U | 12/2010 |
| CN | 203757618 U | 8/2014 |
| CN | 203823673 U | 9/2014 |
| CN | 204554705 U | 8/2015 |
| CN | 105303969 A | 2/2016 |
| CN | 205139528 U | 4/2016 |
| CN | 106371249 A | 2/2017 |
| CN | 206270623 U | 6/2017 |
| CN | 107105180 A | 8/2017 |
| CN | 107479254 A | 12/2017 |
| CN | 207301560 U | 5/2018 |
| CN | 109031747 A | 12/2018 |
| CN | 109445190 A | 3/2019 |
| JP | H10123514 A | 5/1998 |
| JP | 2000137219 A | 5/2000 |
| JP | 2004272045 A | 9/2004 |
| JP | 2007328948 A | 12/2007 |
| JP | 2008159452 A | 7/2008 |
| KR | 20080049888 A | 6/2008 |
| TW | 201003235 A | 1/2010 |

OTHER PUBLICATIONS

International Search Report in corresponding PCT Application No. PCT/CN2019/127127, dated Mar. 23, 2020.

Written Opinion of the International Searching Authority in corresponding PCT Application No. PCT/CN2019/127127, dated Mar. 23, 2020.

* cited by examiner

BACKLIGHT MODULE AND DISPLAY DEVICE

CROSS REFERENCE TO RELATED APPLICATIONS

The present disclosure is the National Stage of International application No. PCT/CN2019/127127, filed on Dec. 20, 2019, which claims priority to Chinese Patent Application No. 201811631377.1, entitled "BACKLIGHT MODULE AND DISPLAY DEVICE" and filed on Dec. 28, 2018 with the National Intellectual Property Administration, the entirety of which is incorporated herein by reference.

TECHNICAL FIELD

The application relates to the technical field of display devices, and particularly relates to a backlight module and a display device using the backlight module.

BACKGROUND

The application relates to the technical field of display devices, and particularly relates to a backlight module and a display device using the backlight module.

Currently, the existing module architectures of liquid crystal display devices are divided into two types. One type (from outside to inside) includes a front frame, a plastic frame, a film, a light guide plate, a reflective sheet, and a back plate. The light guide plate and the reflective sheet are installed on the back plate. The plastic frame is installed on the periphery of the back plate and connected with the light guide plate. The film and a screen are installed on the plastic frame, and the front frame is sleeved on the periphery of the plastic frame and the screen, resulting in many structural components of the module structure and more complexity and higher cost of assembly of the modules.

The second type (from outside to inside) includes a middle frame, a film, a light guide plate, a reflective sheet, and a back plate. The middle frame is installed on the periphery of the back plate, the reflective sheet, the light guide plate, and the film are installed on the back plate in order, and a screen is installed on the middle frame, resulting in complexity of assembly of the modules and a single appearance for no place to install decorative portions.

SUMMARY

The main purpose of the present application is to provide a backlight module and a display device, aiming at providing a backlight module which is easy to assemble, has low cost and can be processed with variable appearance.

In order to achieve the above purpose, the present application provides a backlight module, which includes:

a back plate including a bottom plate, side plates provided surrounding the bottom plate and bent parts formed by bending the side plates, and the bottom plate, the side plates, and the bent parts being enclosed to form an mounting space, one side of the bent parts facing away from the bottom plate being provided with a limiting step, and the bent parts including an upper step surface and a lower step surface connected to the limiting step;

a reflective sheet accommodated in the mounting space and provided on the bottom plate;

a light guide plate accommodated in the mounting space and provided on one side of the reflective sheet away from the bottom plate; and a film accommodated in the mounting space and provided on one side of the light guide plate facing away from the reflective sheet.

Optionally, the upper step surface is recessed with a accommodating groove adjacent to the lower step surface, and a hanging ear is provided in the accommodating groove, the hanging ear is provided adjacent to the limiting step, one side of the film adjacent to the lower step surface is provided with a positioning portion, and the positioning portion is provided with a positioning hole, and the positioning hole is sleeved on the hanging ear.

Optionally, the positioning portion includes a positioning plate perpendicular to the film and a positioning step forming an angle with the positioning plate, the positioning hole is defined on the positioning step, and the film and the positioning portion are integrally formed.

Optionally, the backlight module further includes a support plate detachably provided in the accommodating groove, and the hanging ear is protruded from the support plate adjacent to the limiting step, and the positioning hole abuts against the support plate when sleeved on the hanging ear.

Optionally, both ends of the support plate are provided with through-holes, and a bottom wall of the accommodating groove is provided with matching-holes corresponding to two through-holes, and each of the two bolts passes through one of the two through-holes and is threadedly connected with one of the matching-hole respectively, and the supporting plate is detachably fixed in the accommodating groove.

Optionally, a bottom wall of the accommodating groove is provided with two locking members, and the two locking members are located at both ends of the supporting plate, and each locking member is cooperated with the bottom wall of the accommodating groove to form a clamping groove, and both ends of the support plate are inserted into clamping grooves respectively.

Optionally, each locking member includes a connecting plate and a baffle plate forming an angle with the connecting plate, the connecting plate is accommodated in the accommodating groove, an end of the baffle far away from the connecting plate abuts against the lower step surface, and the connecting plate, the baffle, and the bottom wall of the accommodating groove are cooperated to form clamping groove.

Optionally, the backlight module further includes a positioning member, and the positioning member is accommodated in the mounting space and clamped between the side plates and the light guide plate.

Optionally, two adjacent side plates are connected by welding; and/or, two adjacent bent parts are connected by welding.

Optionally, the bottom plate, the side plates, and the bent parts are integrally bent and formed.

Optionally, two adjacent side plates and two bent parts are cooperated to form a chamfer.

The present application also provides a display device, which includes the above-mentioned backlight module and a display panel, and the backlight module includes:

a back plate including a bottom plate, side plates provided surrounding the bottom plate and bent parts formed by bending the side plates, and the bottom plate, the side plates, and the bent parts being enclosed to form an mounting space, one side of the bent parts facing away from the bottom plate being provided with a limiting step, and the bent parts including an upper step surface and a lower step surface connected to the limiting step;

a reflective sheet accommodated in the mounting space and provided on the bottom plate;

a light guide plate accommodated in the mounting space and provided on one side of the reflective sheet away from the bottom plate;

a film accommodated in the mounting space and provided on one side of the light guide plate facing away from the reflective sheet; and the display panel covering over an opening of the mounting space and being connected to the lower step surface.

Optionally, the upper step surface is recessed with a accommodating groove adjacent to the lower step surface, and a hanging ear are provided in the accommodating groove, the hanging ear is provided adjacent to the limiting step, one side of the film adjacent to the lower step surface is provided with a positioning portion, and the positioning portion is provided with a positioning hole which is sleeved on the hanging ear.

Optionally, the positioning portion includes a positioning plate perpendicular to the film and a positioning step forming an angle with the positioning plate, the positioning hole being provided in the positioning step, and the film and the positioning portion being integrally formed.

Optionally, the backlight module further includes a support plate detachably provided in the accommodating groove, and the hanging ear is protruded from the support plate adjacent to the limiting step, and the positioning hole abuts against the support plate when sleeved on the hanging ear.

Optionally, both ends of the support plate are provided with through-holes, and a bottom wall of the accommodating groove is provided with matching-holes corresponding to two through-holes, and each of the two bolts passes through one of the two through-holes and is threadedly connected with one of the matching-hole respectively, and the supporting plate is detachably fixed in the accommodating groove.

Optionally, a bottom wall of the accommodating groove is provided with two locking members, and the two locking members are located at both ends of the supporting plate, and each locking member is cooperated with the bottom wall of the accommodating groove to form a clamping groove, and both ends of the support plate are inserted into clamping grooves respectively.

Optionally, each locking member includes a connecting plate and a baffle plate forming an angle with the connecting plate, the connecting plate is accommodated in the accommodating groove, an end of the baffle far away from the connecting plate abuts against the lower step surface, and the connecting plate, the baffle, and the bottom wall of the accommodating groove are cooperated to form the clamping groove.

Optionally, an adhesive layer is provided between the display panel and the lower step surface, and the display panel is connected with the lower step surface through the adhesive layer.

Optionally, the bent parts are bent plates which are ends of the side plates far away from the bottom plate being bent towards the mounting space, and the bent parts are provided parallel to the display panel.

In the technical solution of the present application, the bottom plate, side plates, and bent parts of the back plate are enclosed to form an mounting space, the reflective sheet is accommodated in the mounting space and provided on the bottom plate, and the light guide plate is accommodated in the mounting space and provided on one side of the reflective sheet facing away from the bottom plate, and the film is accommodated in the mounting space and provided on one side of the light guide plate facing away from the reflective sheet. When the light source enters the light guide plate, the light guide plate scatters the light around. The reflective sheet effectively reflects the light back to the light guide plate to improve the utilization rate of light, and the film on the light guide plate effectively uniforms the light and converges the large-angle light for frontal observation.

In the present application, one side plate of the back plate is bent to form bent part, and a limiting step is provided on the bent parts, so that the bent parts are formed with an upper step surface and a lower step surface connected to the limiting step and decorative portions are provided on the upper step surface to achieve the effect of variable appearances. Using the bottom plate, side plates, and bent parts of the back plate, the assembly of the components of the backlight module is completed, so that the structure of the backlight module is simple. Further, covering the display panel over the opening of the mounting space and connecting it to the lower step surface, thereby it effectively realizes a frameless backlight module and reduces a thickness of the backlight module, with less structure components, it also simplifies the assembly of the module and has low cost.

BRIEF DESCRIPTION OF THE DRAWINGS

For more clearly explanation of the technical solutions in the embodiments of the present application or the related art, the drawing figures required to use in the description of the embodiments or the related art will be simply introduced as below. Obviously, the drawings described as below are merely some embodiments of the present application. For one of ordinary skill in the art, the drawings of other embodiments can be obtained based on these drawings without creative work.

DESCRIPTION WITH ICON NUMBER

Figure 1:
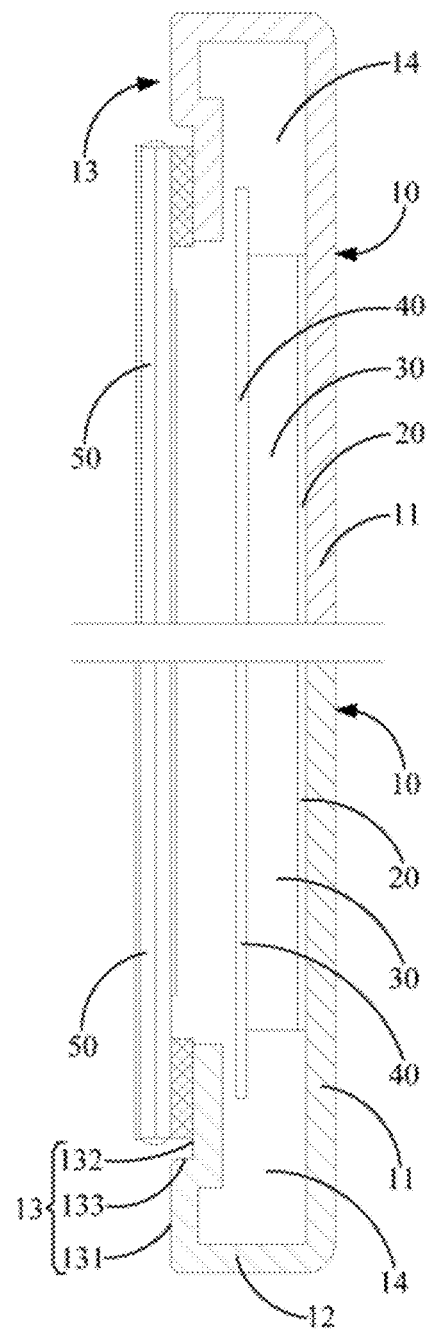
FIG. 1 is a partial cross-sectional view of a backlight module according to an embodiment of the present application.

| Label | Name | Label | Name |
| --- | --- | --- | --- |
| 10 | back plate | 40 | film |
| 11 | bottom plate | 41 | positioning portion |
| 12 | side plate | 411 | positioning plate |
| 13 | bent part | 412 | positioning step |
| 131 | upper step surface | 4121 | positioning hole |
| 1311 | accommodating groove | 50 | display panel |
| 1312 | matching-hole | 61 | locking member |
| 132 | lower step surface | 611 | corresponding hole |
| 133 | limiting step | 62 | support plate |
| 14 | mounting space | 621 | hanging ear |
| 20 | reflective sheet | 622 | through-hole |
| 30 | light guide plate | 70 | bolt |

The realization, functional characteristics, and advantages of the purpose of the present application will be further described in conjunction with the embodiments and with reference to the accompanying drawings.

DETAILED DESCRIPTION OF THE EMBODIMENTS

The technical solutions in the embodiments of the present application will be clearly and completely described in conjunction with the drawings in the embodiments of the present application as below. Obviously, the described embodiments are only some rather than all of the embodiments of the present application. Based on the embodiments in the present application, all other embodiments obtained by one of ordinary skill in the art without creative work shall fall within the protection scope of the present application.

It should be noted that all directional indications (such as up, down, left, right, front, back . . . ) in the embodiments of the present application are only set to explain the relative position relationship, movement situation, etc. between components in a specific posture (as shown in the accompanying drawings). If the specific posture changes, the directional indication will change accordingly.

In the present application, unless otherwise expressly specified and defined, the terms "connected", "fixed", etc. should be interpreted broadly. For example, "fixed" can be a fixed connection, a detachable connection, or integrally formed. It can be a mechanical connection or an electrical connection. It can be directly connected or indirectly connected through an intermediate medium, and it can be the internal communication between two components or the interaction relationship between two components, unless otherwise specifically defined. For one of ordinary skill in the art, the specific meaning of the above terms in the present application can be understood according to the specific situation.

In addition, the descriptions related to "first", "second", etc. in the present application are only set for descriptive purposes, and cannot be understood as indicating or implying their relative importance or implicitly indicating a number of indicated technical features. Therefore, the features defined with "first" and "second" may explicitly or implicitly include at least one of the features. In addition, the technical solutions between the various embodiments can be combined with each other, but must be based on what can be achieved by one of ordinary skill in the art. When a combination of technical solutions is contradictory or cannot be achieved, it should be considered that such a combination of technical solutions does not exist, and is not within the protection scope required by the present application.

The present application proposes a backlight module and a display device.

Figure 2:
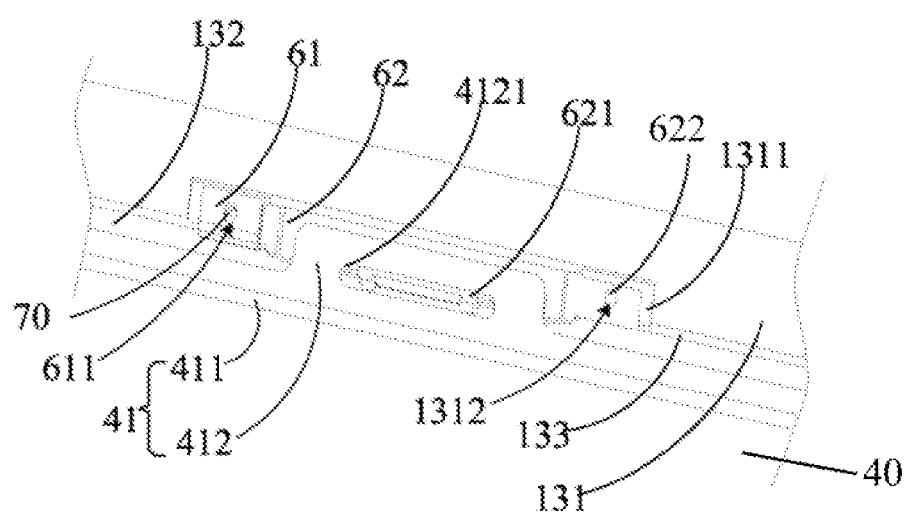
FIG. 2 is a schematic view of a portion of the backlight module according to an embodiment of the present application.

Please refer to FIGS. 1 to 2, in an embodiment of the present application, the display device includes a backlight module and a display panel, and the backlight module includes:

a back plate 10, the back plate 10 including a bottom plate 11, side plates 12 provided surrounding the bottom plate 11, and bent parts 13 formed by bending the side plates 12, the bottom plate 11, the side plates 12 and the bent parts 13 being enclosed to from an mounting space 14, one side of the bent parts 13 facing away from the bottom plate 11 being provided with a limiting step 133, and the bent parts 13 including an upper step surface 131 and a lower step surface 132 connected to the limiting step 133;

a reflective sheet 20, the reflective sheet 20 being accommodated in the mounting space 14 and provided on the bottom plate 11;

a light guide plate 30, the light guide plate 30 being accommodated in the mounting space 14 and provided on one side of the reflective sheet facing away from the bottom plate 11; and a film 40, the film 40 being accommodated in the mounting space 14 and provided on one side of the light guide plate facing away from the reflective sheet; and the display panel 50 covering over an opening of the mounting space 14 and connected to the lower step surface 132.

In this embodiment, the bent part 13 is a bent plate which is one end of the side plates 12 far away from the bottom plate 11 bent toward the mounting space 14. The bent plate is provided parallel to the display panel 50. Of course, the bent plate may also be slightly inclined to the display panel 50.

In this embodiment, the bottom plate 11, the side plates 12, and the bent parts 13 are integrally bent and formed, and the bending process includes a bending process of such as punching the back plate 10 and so on, so that the processing force during the forming process bring an increase of the structure strength of the back plate 10, thereby reducing the thickness of the back plate 10, and achieving extremely thin of the display device.

In this embodiment, two adjacent side plates 12 are connected by welding; and two adjacent bent parts 13 are connected by welding.

It can be understood that in order to avoid gaps between two adjacent side plates 12 and gaps between two adjacent bent parts 13, the gaps are filled by welding, thereby improving the integrity, closure and structure strength of the back plate 10, and small impurities such as dust will not enter inside of the liquid crystal display device.

In one embodiment, the two adjacent side plates 12 and the two bent parts 13 cooperate to form a chamfer, so that the welding of the two bent parts 13 is in a straight line inclined at 45°, thereby avoiding corners of the back plate 10 are chamfered twice.

In this embodiment, the bottom plate 11, the side plates 12 provided surrounding the bottom plate 11, and the bent plates by bending ends of the side plates 12 far away from the bottom plate 11 form an mounting space with an opening. The reflective sheet 20, the light guide plate 30, the film 40, the positioning member, and other electronic components are put into the mounting space through the opening. The reflective sheet 20 is provided on the bottom plate 11, and the light guide plate 30 is provided on one side of the reflective sheet 20 facing away from the bottom plate 11. The film 40 is provided on one side of the light guide plate 30 facing away from the reflective sheet 20. When light enters the light guide plate 30, the light guide plate 30 scatters the light around. The reflective sheet 20 effectively reflects the light back to the light guide plate 30 to improve an utilization rate of the light, and the film 40 located on the light guide plate 30 effectively uniforms the light and converges the large-angle light for frontal observation.

In the present application, the side plates 12 of the back plate 10 are bent to form bent parts 13, and a limiting step 133 is provided on the bent parts 13, so that the bent parts 13 is formed with an upper step surface 131 and a lower step surface 132 connected to the limiting step 133 and decorative portions are provided on the upper step surface 131 to achieve the effect of variable appearances. Using the bottom plate 11, side plates 12, and bent parts 13 of the back plates 10, the assembly of the components of the backlight module is completed, and the structure of the backlight module is simple. Further, covering the display panel 50 over the opening of the mounting space 14 and connecting it to the lower step surface 132, it effectively realizes a frameless backlight module and reduces a thickness of the backlight module, with less structure components, it also simplifies the assembly of the module and has low cost.

In one embodiment, the upper step surface 131 is recessed with an accommodating groove 1311 adjacent to the lower step surface 132. A hanging ear 621 is provided in the accommodating groove 1311, and the hanging ear 621 is provided adjacent to the limiting step 133. One side of the film 40 adjacent to the lower step surface 132 is provided with a positioning portion 41, and the positioning portion 41 is provided with a positioning hole 4121 which is sleeved on the hanging ear 621.

The hanging ear 621 is accommodated in the accommodating groove 1311. On the one hand, the hanging ear 621 is effectively hidden, and on the other hand, the space occupation is effectively reduced. In this embodiment, the positioning portion 41 includes a positioning plate 411 perpendicular to the film 40 and a positioning step 412 forming an angle with the positioning plate 411. The positioning hole 4121 is defined on the positioning step 412, and the film 40 and the positioning portion 41 are integrally formed, which is beneficial to production;

when the film 40 is sleeved on the hanging ear 621 through the positioning hole 4121, a portion of the positioning portion 41 is accommodated in the accommodating groove 1311, and another portion of the positioning portion 41 is located between the lower step surface 132 and the display panel 50. On the one hand, the film 40 is effectively fixed on the back plate 10 in a hanging manner, and on the other hand, the film 40 is effectively hidden.

In this embodiment, an adhesive layer is provided between the display panel 50 and the lower step surface 132, and the display panel 50 is connected with the lower step surface 132 through the adhesive layer.

The adhesive layer can be an EVA adhesive layer, glue, or double-sided adhesive. A thickness of the adhesive layer is greater than a thickness of the positioning step 412 of the positioning portion 41, thereby effectively avoiding the mutual influence between the positioning portion 41 and the display panel 50, and realizing the fixed installation of the display panel 50, so that the display panel 50 can be easily disassembled and repaired in the future.

In one embodiment, the backlight module further includes a support plate 62 detachably provided in the accommodating groove 1311, and the hanging ear 621 is protruded from the support plate 62 adjacent to the limiting step 133. When the positioning hole 4121 is sleeved on the hanging ear 621, the positioning portion 41 abuts against the support plate 62.

In this embodiment, both ends of the support plate 62 are provided with through-holes 622, and a bottom wall of the accommodating groove 1311 is provided with matching-holes 1312 corresponding to the two through-holes 622, and two bolts 70 pass through the through-holes 622 and are threadedly connected the matching-holes 1312 respectively. The support plate 62 is detachably fixed in the accommodating groove 1311. When the hanging ear 621 is damaged, the user removes the support plate 62 for replacement, which is beneficial for maintenance.

In one embodiment, a bottom wall of the accommodating groove 1311 is provided with two locking members 61 located at both ends of the supporting plate 62, and each locking member 61 is cooperated with the bottom wall of the accommodating groove 1311 to form a clamping groove. Both ends of the support plate 62 are inserted into the clamping groove, respectively.

Each locking member 61 is provided with a corresponding hole 611 corresponding to one of the through-holes 622. The two bolts 70 pass through the corresponding holes 611 and the through-holes 622 and are threadedly connected with the matching-holes 1312, so that the locking member 61 is fixed in the accommodating groove 1311 and the support plate 62 is fixed twice. When loose occurs between the through-holes 622 of the support plate 62 and the bolts 70, the two ends of the support plate 62 are limited in the clamping grooves formed by the cooperation of the locking member 61 and the bottom wall of the accommodating groove 1311, thereby effectively avoiding the looseness between the support plate 62 and the bolts 70. It is also easy to disassemble and beneficial for maintenance.

Specifically, each locking member 61 includes a connecting plate and a baffle plate forming an angle with the connecting plate. The connecting plate is accommodated in the accommodating groove 1311. An end of the baffle far away from the connecting plate abuts against the lower step surface 132. The connecting plate, the baffle, and the bottom wall of the accommodating groove 1311 are cooperated to form clamping grooves.

The connecting plate and the baffle can be integrally formed with the locking portion 61 during the integral stamping and forming process of the locking portion 61, which is beneficial to production. In this embodiment, one end of the connecting plate far away from the baffle abuts against a joint of the limiting step 133 and the lower step 132, and one end of the support plate 62 is limited between the baffle and the bottom wall of the accommodating groove 1311. The weight of the support plate 62 is burdened by the connecting plate to achieve secondary fixation.

When looses occur between the support plate 62 and the bolts 70, and slightly looses occurs between the bolts 70 and the locking members 61, gaps are formed between the bottom wall of the accommodating groove 1311 and the locking members 61. However, the end of the connecting plate away from the baffle is still limited at the joint of the limiting step 133 and the lower step surface 132, thereby effectively preventing gap offsets generated between the support plate 62 and the locking members 61 via the bottom wall of the accommodating groove 1311.

Optionally, the backlight module of this embodiment further includes a positioning member, and the positioning member is accommodated in the mounting space 14 and clamped between the side plates 12 and the light guide plate 30.

It is understood that a width or a length of the light guide plate 30 is matched with a size between two side walls at the opening of the mounting space 14, and the positioning member is clamped between the side plates 12 and the light guide plate 30, thereby effectively fixing the light guide plate 30 in the mounting space 14, and meanwhile, the light guide plate 30 is provided corresponding to the opening of the mounting space 14.

In this embodiment, there are three positioning members. One end of each of the three positioning members respectively abuts against a left side wall, a right side wall or a top wall in the mounting space 14, and the other end of each of the three positioning members respectively abuts against a left side wall, a right side wall or a top wall of the light guide plate 30, thereby effectively achieve the fixation, easily disassemble and assemble, and low cost.

The present application also provides a display device, which includes the above-mentioned backlight module. The structure of the backlight module can refer to the above-mentioned embodiments, and will not be repeated here. Naturally, due to the display device of this embodiment adopts the technical solution of the above-mentioned backlight module, the display device has all the functions of the above-mentioned backlight module.

The above descriptions are only optional embodiments of the present application, and do not limit the scope of the patents of the application. Under the inventive concept of the present application, the equivalent structure transformations made by using the description and drawings of the present application, or direct/indirect application to other related technical fields are included in the scope of patent protection of the present application.

What is claimed is:

1. A backlight module, comprising:
a back plate comprising a bottom plate, side plates surrounding the bottom plate, and bent parts formed by bending the side plates, wherein the bottom plate, the side plates, and the bent parts form a mounting space, each of the sides of the bent parts away from the bottom plate is provided with a limiting step, each of the bent parts comprises an upper step surface and a lower step surface connected to the limiting step, and a part of a side of one of the upper step surfaces is recessed with an accommodating groove adjacent to one corresponding lower step surface;
a support plate detachably disposed in the accommodating groove, and provided with a hanging ear protruding from a part of the support plate adjacent to the limiting step; and
a film disposed on the bottom plate in the mounting space and provided with a positioning portion, wherein the positioning portion comprises a positioning plate extending from a part of a side of the film close to the accommodating groove and perpendicular to the film and a positioning step extending from the positioning plate to the accommodating groove and forming an angle with the positioning plate, the positioning step is provided with a positioning hole corresponding to the hanging ear, and the positioning step is sleeved on the hanging ear through the positioning hole.

2. The backlight module as claimed in claim 1, further comprising a reflective sheet disposed on the bottom plate in the mounting space, wherein the film disposed on a side of the reflective sheet away from the bottom plate.

3. The backlight module as claimed in claim 2, further comprising a light guide plate disposed between the reflective sheet and the film in the mounting space.

4. The backlight module as claimed in claim 1, wherein two adjacent side plates and two bent parts are cooperated to form a chamfer.

5. The backlight module as claimed in claim 1, wherein both ends of the support plate are provided with through-holes, and a bottom wall of the accommodating groove is provided with matching-holes corresponding to two through-holes, and each of the two bolts passes through one of the two through-holes and is threadedly connected with one of the matching-hole respectively, and the supporting plate is detachably fixed in the accommodating groove.

6. The backlight module as claimed in claim 1, wherein a bottom wall of the accommodating groove is provided with two locking members located at both ends of the supporting plate, and each locking member is cooperated with the bottom wall of the accommodating groove to form a clamping groove, and both ends of the support plate are inserted into clamping grooves respectively.

7. The backlight module as claimed in claim 6, wherein each locking member includes a connecting plate and a baffle plate forming an angle with the connecting plate, the connecting plate is accommodated in the accommodating groove, an end of the baffle far away from the connecting plate abuts against the corresponding lower step surface, and the connecting plate, the baffle, and the bottom wall of the accommodating groove are cooperated to form the clamping groove.

8. The backlight module as claimed in claim 1, wherein the backlight module further includes a positioning member, and the positioning member is accommodated in the mounting space and clamped between the side plates and the light guide plate.

9. The backlight module as claimed in claim 1, wherein two adjacent side plates are connected by welding, and two adjacent bent parts are connected by welding.

10. The backlight module as claimed in claim 1, wherein the side plates extend from the bottom plate, and the bent parts extend from the side plates.

11. A display device, comprising:
a backlight module comprising:
a back plate comprising a bottom plate, side plates surrounding the bottom plate, and bent parts formed by bending the side plates, wherein the bottom plate, the side plates, and the bent parts form a mounting space, each of the sides of the bent parts away from the bottom plate is provided with a limiting step, each of the bent parts comprises an upper step surface and a lower step surface connected to the limiting step, and a part of a side of one of the upper step surfaces is recessed with an accommodating groove adjacent to one corresponding lower step surface;
a support plate detachably disposed in the accommodating groove, and provided with a hanging ear protruding from a part of the support plate adjacent to the limiting step; and
a film disposed on the bottom plate in the mounting space and provided with a positioning portion, wherein the positioning portion comprises a positioning plate extending from a part of a side of the film close to the accommodating groove and perpendicular to the film and a positioning step extending from the positioning plate to the accommodating groove and forming an angle with the positioning plate, the positioning step is provided with a positioning hole corresponding to the hanging ear, and the positioning step is sleeved on the hanging ear through the positioning hole; and
a display panel covering over an opening of the mounting space and connected to the lower step surfaces.

12. The display device as claimed in claim 11, further comprising an adhesive layer disposed between the display panel and the lower step surfaces, and the display panel is connected with the lower step surfaces through the adhesive layer.

13. The display device as claimed in claim 11, wherein the backlight module further comprises a reflective sheet disposed on the bottom plate in the mounting space, and the film is disposed on a side of the reflective sheet away from the bottom plate.

14. The display device as claimed in claim 13, wherein the backlight module further comprises a light guide plate disposed between the reflective sheet and the film in the mounting space.

15. The display device as claimed in claim 11, wherein the bent parts extend from ends of the side plates away from the bottom plate to the mounting space, and the bent parts are parallel to the display panel.

16. The display device as claimed in claim 11, wherein both ends of the support plate are provided with through-holes, and a bottom wall of the accommodating groove is provided with matching-holes corresponding to two through-holes, and each of the two bolts passes through one of the two through-holes and is threadedly connected with one of the matching-hole respectively, and the supporting plate is detachably fixed in the accommodating groove.

17. The display device as claimed in claim 11, wherein a bottom wall of the accommodating groove is provided with two locking members, and the two locking members are located at both ends of the supporting plate, and each locking member is cooperated with the bottom wall of the accommodating groove to form a clamping groove, and both ends of the support plate are inserted into clamping grooves respectively.

18. The display device as claimed in claim 17, wherein each locking member comprises a connecting plate and a baffle plate forming an angle with the connecting plate, the connecting plate is accommodated in the accommodating groove, an end of the baffle far away from the connecting plate abuts against the corresponding lower step surface, and the connecting plate, the baffle, and the bottom wall of the accommodating groove are cooperated to form the clamping groove.

* * * * *